Nov. 16, 1943.　　　　　　J. ETTL　　　　　2,334,485
APPARATUS FOR COMBINING MATERIALS
Filed June 14, 1940　　　3 Sheets-Sheet 1
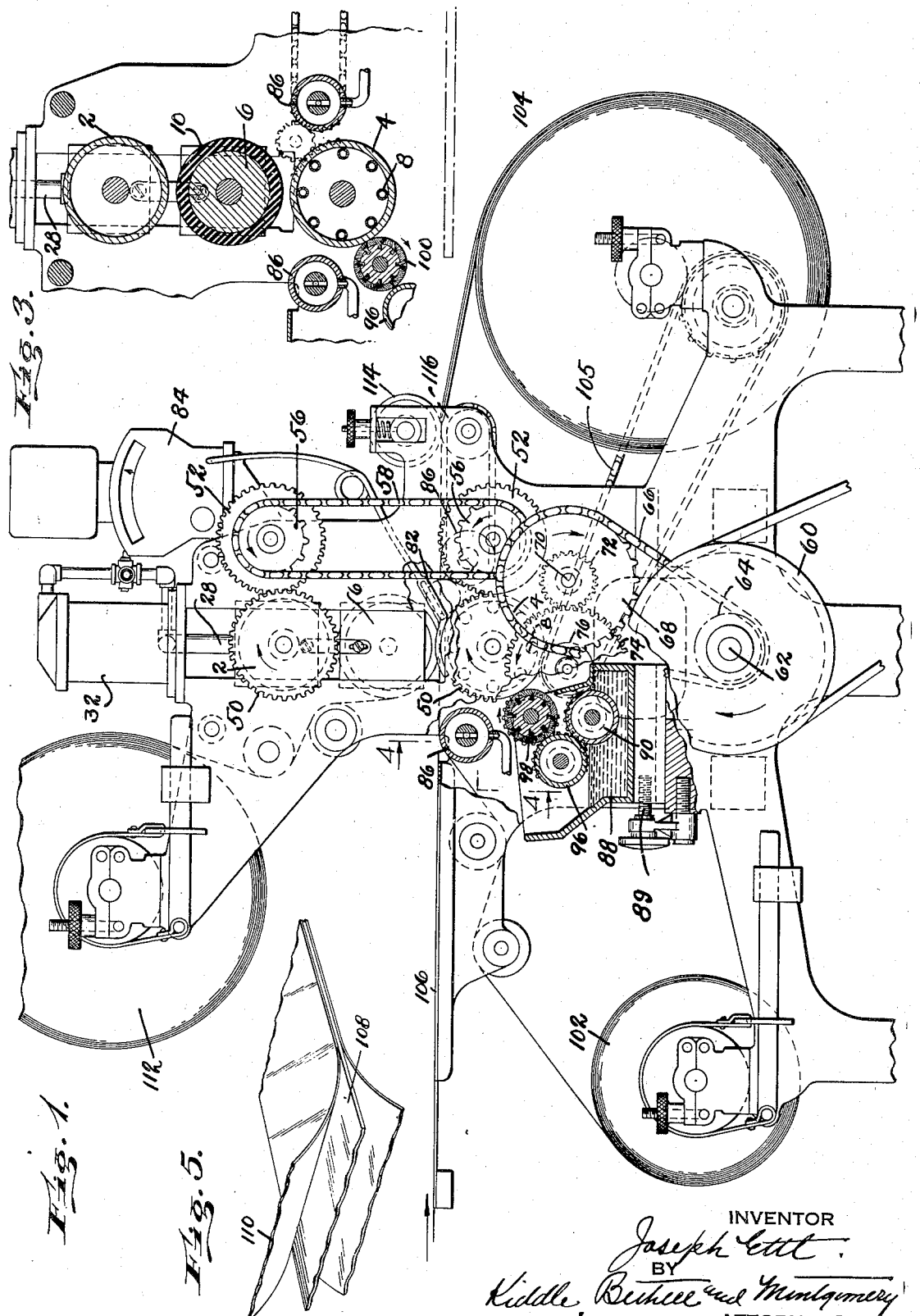

Nov. 16, 1943.  J. ETTL  2,334,485
APPARATUS FOR COMBINING MATERIALS
Filed June 14, 1940  3 Sheets-Sheet 2
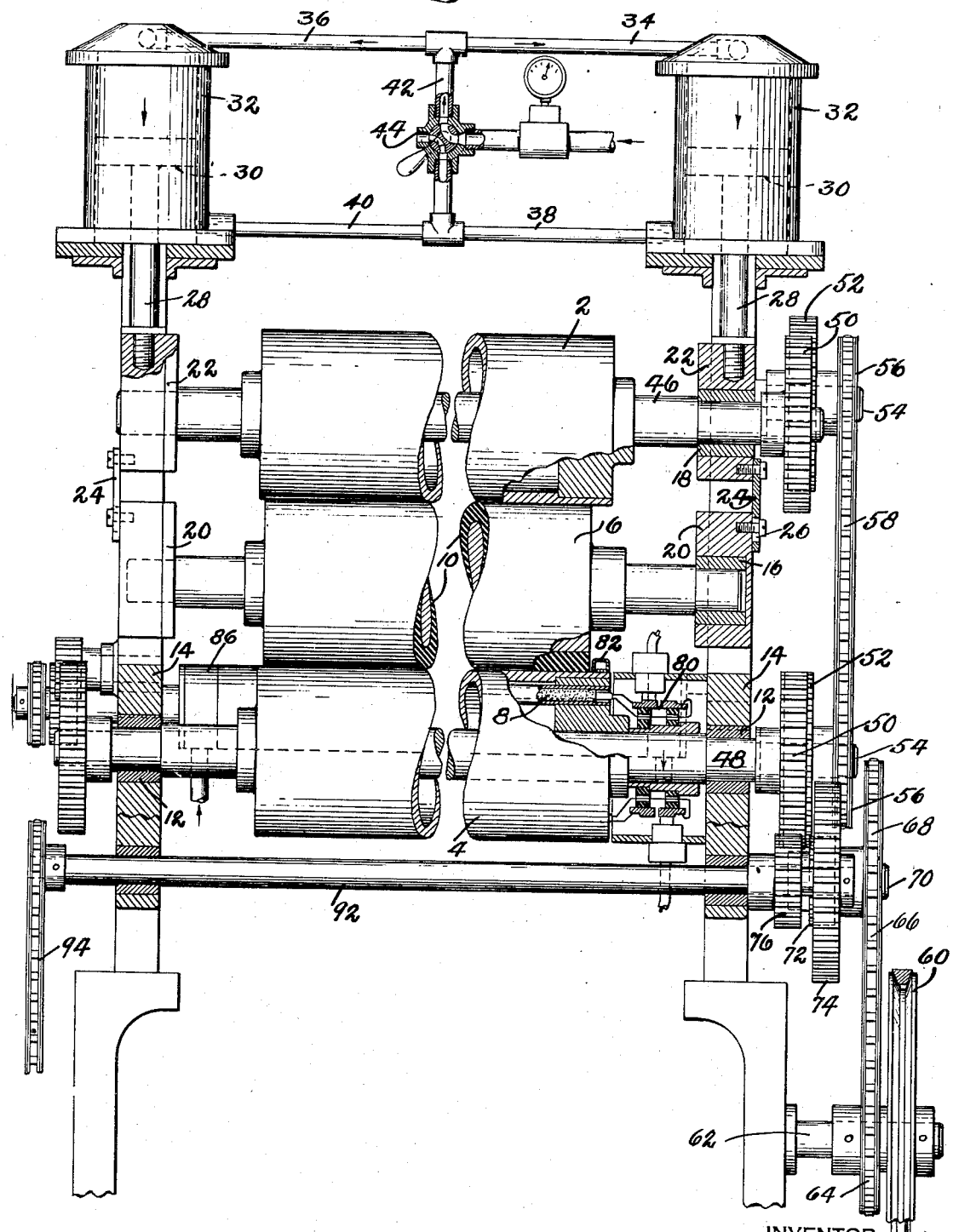
INVENTOR
Joseph Ettl
BY
Kiddle, Buhrell and Montgomery.
ATTORNEYS.

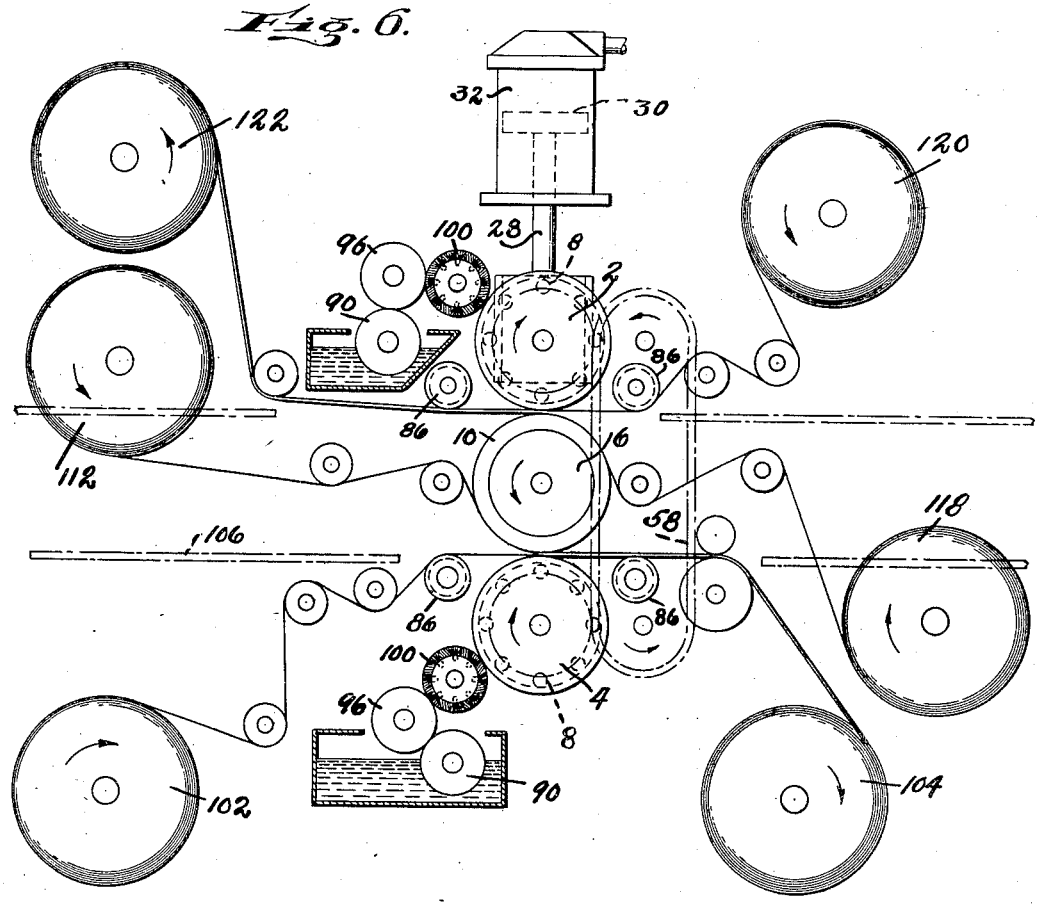

Patented Nov. 16, 1943

2,334,485

UNITED STATES PATENT OFFICE 2,334,485

APPARATUS FOR COMBINING MATERIALS

Joseph Ettl, Highlands, N. J., assignor to Potdevin Machine Company, Brooklyn, N. Y., a corporation of New York Application June 14, 1940, Serial No. 340,461

14 Claims. (Cl. 154—37)

This invention is directed to an improvement in combining machines, that is, to machines making laminated materials, for example, where it is desired to combine transparent or semitransparent sheets or webs with opaque sheets or webs. The combining sheet may be a material which becomes plastic and sticky upon heating, or it may have had a coating of a suitable adhesive previously applied to it which becomes tacky on the application of heat.

My machine is constructed and arranged to apply a combining sheet to either or both sides of the base material. The latter may be in the form of a sheet or of a web, and may be paper, cardboard, wood, etc. The combining sheet, as above mentioned, may be precemented or may become sticky when heated, or the base material may be precemented.

On the other hand, two combining sheets may be laminated or combined directly without any intermediate base sheet or web.

Again my machine is adapted to produce a laminated material composed of two sheets or webs of the base materials above mentioned with an intervening sheet or web of combining material which, of course, may be cemented on its face or may be simply a material which becomes plastic and sticky when heated.

In its simplest form my improved machine comprises three rollers arranged one above the other, the upper and lower rollers being geared together so as to run at the same surface speed, the intermediate roller being frictionally driven by the other two.

The upper and lower rollers are of steel, for example, and either or both may be heated, depending upon the type of work being run on the machine. The intermediate roller is faced with rubber or other suitable resilient material.

I am aware that it has been suggested prior to this invention to combine sheets or webs by running the same between two rollers, one of which is a hard roller, the other resilient.

In such a machine, however, owing to the fact that the face of one roller is resilient it is not possible to avoid changing diameters with the result that the surface speed of one roller is not precisely the same as that of the other. This causes a differential in the relative speeds of the two materials being combined, resulting in creepage and of course an unsatisfactory finished product. This effect is very pronounced when the combining sheet is simply a transparent film but a few thousandths thick. For example, the transparent film-like materials which are employed for book covers. The creepage produces fine hair-like lines in the film, bubbles, etc.

My machine, however, inherently overcomes these difficulties. As above noted, I provide a hard roller at each side of a resilient roller, the hard rollers being geared together one-to-one so that they must travel at the same peripheral speed, while the resilient roller is driven by the pressure of the other two, and hence necessarily has the same peripheral speed as they have.

Chilling rollers are provided at each side of the machine for chilling the material as it enters and as it leaves the machine.

The chilling rollers at the feed side of the machine are placed as near as possible to the combining rollers, and their primary function is to prevent distortion and elongation of the combining material as it moves into proximity to the heated combining roller. Such distortion, it will be appreciated, is likely to produce fine wrinkles extending generally lengthwise of the work. The chilling rollers at the discharge side of the machine quickly cool the material after it has passed the combining rollers, to prevent distortion after laminating or combining and loosening of the combined materials.

Among other novel features of the machine which may be mentioned at this point is the lubricating means which I provide for the upper and lower presser rollers. This lubricant which may take the form of a high temperature oil has several functions. It keeps the combining rollers clean and bright and unscored, and at the same time it provides for preventing sticking of the web or sheet to the adjacent roller and tearing away of the combining sheet from the base material. It also eliminates the necessity of reversing temperatures in the combining rollers as is done in platen machines wherein materials are combined between two heated platens, the platens then being cooled before they are separated and the combined materials removed.

In the accompanying drawings wherein I have illustrated my invention:

Fig. 1 is a side elevation of one embodiment of my invention;

Fig. 2 is a part sectional end view;

Fig. 3 is a cross sectional view through the combining rollers and associated cooling or chilling rollers;

Fig. 4 is a view taken on the line 4—4 of Fig. 1;

Fig. 5 shows part of an article adapted to be produced by my invention; and

Fig. 6 shows another embodiment of the invention.

Referring to the drawings in detail: 2 and 4 designate the upper and lower rollers, respectively, and 6 the intermediate roller of my improved machine. For clarity of description the rollers 2, 4 and 6 will be referred to as combining rollers.

In the embodiment of my invention as illustrated in Figs. 1 to 3, for instance, the combining rollers 2 and 4 are hard surfaced, steel, for example. The lower roller 4 is heated as, for example, by electric cartridge heaters 8. The intermediate combining roller 6 may have a steel core, but it is faced with rubber 10 or other resilient material.

As will be seen from Fig. 2, for example, the lower roller 4 is mounted for rotation in fixed bearings 12 in the side frames 14 of the machine.

The bearings 16 and 18 of the intermediate roller 6 and upper roller 2, respectively, are vertically adjustable not only with respect to each other but with respect to the lower roller.

As illustrated in Fig. 2 the bearings 16 for the intermediate combining roller 6 are carried in blocks 20 suspended by plates 24 from the blocks 22 carrying the bearings 18 of the upper combining roller 2. These plates 24 are slotted, as seen at 26, so as to vary the spacing between the bearings 16 and 18.

The pressure means for the combining rollers comprises piston rods 28 secured to the blocks 22, each rod being provided with a piston 30 in cylinder 32. The pressure medium employed is an elastic fluid such as compressed air or steam. Conduits 34 and 36 lead into the top of the cylinders 32 and conduits 38 and 40 lead to the bottom of the cylinders. Across these conduits is a pipe connection 42 provided with suitable valve mechanism 44 whereby the pressure fluid from any suitable source can be admitted at will to above the pistons 30 or beneath the pistons, as desired. The purpose of this arrangement, as will be understood, is to provide for the proper regulation of the pressure between the combining rollers 2, 6 and 4.

As was stated at the outset of this description, the combining rollers 2 and 4 are geared together one-to-one so as not only to be positively driven but at the same peripheral speed, the rollers being of the same diameter. The intermediate roller 6 is frictionally driven by the rollers 2 and 4. In this connection it will be noted that the shaft 46 carrying the roller 2 and the shaft 48 carrying the roller 4 are provided with gears 50. These gears mesh with gears 52 on stub shafts 54 carrying sprockets 56 equipped with sprocket chain 58.

The main drive for the machine is taken off the drive pulley 60. The shaft 62 carrying this pulley is provided with a sprocket 64 driving a sprocket chain 66 which in turn drives sprocket 68. The shaft 70 carrying the sprocket 68 carries a gear 72 meshing with gear 74 to drive gear 76 on the same shaft with 74. The gear 76 meshes with the gear 50 on the shaft 48 carrying the lower roller 4, this gear meshing with the gear 52 already referred to which is on the shaft 54 carrying the sprocket 56.

As above mentioned the lower combining roller 4 is heated, for example, by electric cartridge heaters 8. The slip rings for these heaters are dsignated 80. The circuit for these cartridge heaters is controlled by a suitable thermostat 82 which, as illustrated, is in the form of a shoe adapted to contact the surface of the roller 4 and is connected to suitable control mechanism 84 simply illustrated in general in Fig. 1 whereby the circuit to the cartridge heaters will be closed and opened automatically.

As pointed out at the beginning of this description, chill rollers are provided at the loading and discharge side of the machine so that the materials being combined can be chilled as they enter the machine and as they leave it.

With reference to Fig. 1, the chill rollers are designated 86 and may conveniently be chilled by flowing water therethrough. It is to be noted that these rollers are placed in close proximity to the heated roller 4 at each side thereof, so as to prevent elongation and distortion of the combining film from the heat of the roller 4.

I have found it advantageous to lubricate the heated roller 4. This keeps the surface of the roller 4 clean and bright at all times so as to prevent scoring or otherwise marring the combining material and also prevents the material passing through the machine from sticking to the roller and tearing itself away from the base material. By eliminating this last mentioned difficulty it will be apparent that the roller 4 may be kept heated at all times without the necessity of intermittently heating and cooling.

In Fig. 1 I show a tank 88 which contains any suitable lubricating material as, for example, a high temperature oil. Partially immersed in this lubricating material is a roller 90 positively driven through shaft 92 which carries the gear 76 and sprocket chain 94.

Geared to the roller 90 are transfer roller 96 and roller 98, the roller 98 contacting the lower combining roller 4. The roller 98 is provided on its surface with a brush 100. This brush, as will be seen from Fig. 4, is preferably in the nature of a relatively narrow rubber or felt strip wound helically about the roller 98. The purpose of providing this construction is to provide for polishing the roller 4 so that I not only obtain the application of a lubricant to the roller 4 but I also maintain the surface of the same clean and bright. This is quite important in connection with the combining of materials such as Cellophane, the slightest scoring of the roller surface or the presence of foreign material on the surface of the roller 4 marring the surface of the Cellophane and spoiling the work. The tank 88 together with the rollers 90, 96 and 98 is bodily adjustable by adjusting screw 89 to adjust the pressure of the brush upon the surface of the roller 4.

When it is desired to combine, for example, a web of paper with a transparent layer, the paper web may be taken from any suitable source of supply and the transparent layer may be taken, for example, from supply roll 102. The two materials are brought together at the chill roll 86 which is in close proximity to the presser rollers 6 and 4 so that distortion of the combining material from the heat of roller 4 is avoided. It will be understood that the rollers 2 and 6 have previously been adjusted for the proper pressure upon the work. Therefore, as the two materials in superimposed relation pass between the combining rollers 6 and 4 they will be united and passing over the chill roller 86 be discharged from the machine to wind-up reel 104, for example. This reel is driven through sprocket chain 105. The chill roller 86 protects the combining material from being distorted due to the heat of the roller 4.

It is to be understood that where a film and sheet material are to be combined, as distinguished from two webs, the film or transparent material may be taken from the supply roller 102, as before, the sheet material being fed along the feed table 106 meeting the film at the chilled roller 86 at the entrance side of the machine. In this case the combined material may be discharged to any suitable conveyor which will take it out of the machine completely.

In some cases it may be desired to apply a transparent material, for example, to each side of a web or of a sheet to provide the article illustrated in Fig. 5 in which event the sheet or the web 108 may be fed along the table 106. The film which is to be applied to the underside of the material 108 may be taken from the supply roll 102. The upper web of material 110 may be taken from supply roll 112. The operation is quite obvious from the drawings, the three materials passing between the rollers 6 and 4 in superimposed relation with the sheet or the web 108 intermediate the two transparent sheets, the material after discharging from the machine being wound upon the rewind reel 104. In all cases I provide presser rollers 114 and 116 at the exit side of the machine and the finished material passes between these presser rollers before being discharged from the machine or before being wound up on the rewind reel 104.

In Fig. 6 I have illustrated another embodiment of my invention where the amount of work that can be turned out on one machine is increased. Referring to Fig. 6, it will be seen that material from the supply roll 102 and the supply roll 112 may be combined as explained in connection with Fig. 1 and rewound on the roller or reel 104 or the material from the supply rolls 102 and 112 may be combined with a web or sheet passing along the feed table 106 and rewound on the reel 104 or discharged from the machine just as desired. At the same time I may take material from the supply reel 118 and lead it between the rollers 2 and 6 along with material from a supply roller 120. In this case the roller 2 will be heated and it will be lubricated by mechanism similar to that described in connection with Fig. 1 and the materials taken from 118 and 120 after being combined are rewound on reel 122. This material of course will pass through the machine in the opposite direction to the material passing between the rollers 6 and 4.

As in the case of the lower part of the machine, the materials from the rollers 118 and 120 may be combined directly or with a sheet or web fed between them.

It will be appreciated from all of the foregoing that my invention provides a machine for combining materials which is inherently far superior to prior machines in the respects hereinbefore referred to.

It is to be understood that changes may be made in the details of construction and arrangement of parts herein described without departing from the spirit and scope of my invention.

What I claim is:

1. A machine for combining a base material and a material which becomes tacky upon heating, said machine comprising in combination upper and lower hard surfaced combining rollers geared together for positive drive at identical peripheral speeds, an intermediate resilient surfaced friction combining roller frictionally driven by the said upper and lower rollers, means for heating one of said first mentioned combining rollers, and means for passing the materials to be combined between the friction roller and the heated combining roller with the second mentioned material in contact with the heated roller.

2. A machine for combining a base material and a material which becomes tacky upon heating, said machine comprising in combination upper and lower combining rollers geared together for positive drive at identical peripheral speeds, an intermediate rubber-covered combining roller frictionally driven by the said upper and lower rollers, heating means for one of the first mentioned combining rollers, and means for passing the materials to be combined between the rubber covered roller and the said heated roller with the second mentioned material in contact with the heated roller.

3. A machine for combining a base material and a material which becomes tacky upon heating, said machine comprising in combination upper and lower hard surfaced combining rollers geared together for positive drive at identical peripheral speeds, an intermediate resilient surfaced combining roller frictionally driven by the said upper and lower rollers, the upper roller and intermediate roller being bodily adjustable toward and away from each other, means for heating one of the first mentioned combining rollers, and means for passing the materials to be combined between the intermediate roller and the heated roller with the second mentioned material in contact with the heated roller.

4. A machine for combining a base material and a material which becomes tacky upon heating, said machine comprising in combination upper and lower hard surfaced combining rollers geared together for positive drive at identical peripheral speeds, an intermediate resilient surfaced combining roller frictionally driven by the said upper and lower rollers, floating bearings for the upper and intermediate rollers, means for heating one of the first mentioned combining rollers, and means for passing the materials to be combined between the intermediate roller and the heated roller with the second mentioned material in contact with the heated roller.

5. A machine for combining a base material and a material which becomes tacky upon heating, said machine comprising in combination upper and lower combining rollers geared together for positive drive at identical peripheral speeds, an intermediate combining roller frictionally driven by the said upper and lower rollers, floating bearings for the upper and intermediate rollers, gaseous pressure means for applying pressure to said bearings, means for heating one of the first mentioned rollers, and means for passing the materials to be combined between the intermediate roller and the heated roller, with the second mentioned material in contact with the heated roller.

6. A machine for combining a base material and a material which becomes tacky upon heating, said machine comprising in combination upper and lower combining rollers geared together for positive drive at identical peripheral speeds, an intermediate combining roller frictionally driven by the said upper and lower rollers, means for heating the said lower roller, means for passing the materials to be combined between the intermediate roller and said heated roller, with the second mentioned material in contact with the heated roller, and a chill roll in proximity to the upper surface of the heated roller at the feed side of the roller for chilling the materials to be combined just before they enter between the intermediate and heated rollers.

7. A machine for combining a base material and a material which becomes tacky upon heating, said machine comprising in combination upper and lower combining rollers geared together for positive drive at identical peripheral speeds, an intermediate combining roller frictionally driven by the said upper and lower rollers, means for heating the said lower roller, means for passing the materials to be combined between the intermediate roller and said heated roller, with the second mentioned material in contact with the heated roller, and a chill roll in proximity to the upper surface of the heated roller at the discharge side of the roller for chilling the combined materials just as they pass from between the intermediate and heated rollers.

8. A machine for combining a base material and a material which becomes tacky upon heating, said machine comprising in combination upper and lower combining rollers geared together for positive drive at identical peripheral speeds, an intermediate combining roller frictionally driven by the said upper and lower rollers, means for heating the said lower roller, means for passing the materials to be combined between the intermediate and heated rollers, with the second mentioned material in contact with the heated roller, and a chill roll in proximity to the upper surface of the heated roller at the feed and discharge sides of the roller whereby the materials to be combined are chilled just before entering between the intermediate and heated rollers and the combined materials chilled just as they leave the said rollers.

9. A machine for combining a base material and a material which becomes tacky upon heating, which machine comprises in combination upper and lower combining rollers geared together for positive drive at identical peripheral speeds, an intermediate combining roller frictionally driven by the said upper and lower rollers, means for heating one of the first mentioned rollers, means for passing the materials to be combined between the intermediate roller and the heated roller, with the second mentioned material in contact with the heated roller, and means for lubricating the surface of the heated roller to prevent adhesion of the second mentioned material thereto.

10. A machine for combining a base material and a material which becomes tacky upon heating, which machine comprises in combination upper and lower combining rollers geared together for positive drive at identical peripheral speeds, an intermediate combining roller frictionally driven by the said upper and lower rollers, means for heating one of the first mentioned rollers, means for passing the materials to be combined between the intermediate roller and the heated roller, with the second mentioned material in contact with the heated roller, and means comprising a helical brush for polishing and applying a lubricant to the surface of the heated roller to prevent adhesion of the second mentioned material thereto.

11. A machine for combining a base material and a material which becomes tacky upon heating, which machine comprises in combination a pair of metal combining rollers of the same diameter, a one-to-one gear train connecting the two rollers for positive drive at the same peripheral speed, an intermediate roller the surface of which is resilient, said intermediate roller being frictionally driven by the two first mentioned rollers, floating bearings for one of the metal rollers, a gaseous medium for applying pressure to said floating bearings, means for heating one of said metal rollers, and means for passing the materials to be combined between said heated roller and the intermediate roller, with the second mentioned material in contact with the heated roller.

12. A machine of the class described, comprising in combination two metal combining rollers, an intermediate non-metallic combining roller frictionally driven by the metal rollers, a gear train connecting the metal rollers for positively driving the same at identical peripheral speeds, a roller for carrying a web of base material, a roller for carrying a web of combining material which becomes tacky under heat, means for heating one of said metal rolls to heat the combining material as it is fed between the non-metallic roller and the heated roller with the said combining material in contact with the heated roller, a gaseous medium for imposing pressure on the bearings of one of said rollers and said intermediate roller, and a chill roll adapted to be contacted by the combining material just prior to the entry of the same between the intermediate and the heated roller.

13. A machine of the class described, comprising in combination two metal combining rollers, an intermediate non-metallic combining roller frictionally driven by the metal rollers, a gear train connecting the metal rollers for positively driving the same at identical peripheral speeds, a roller for carrying a web of base material, a roller for carrying a web of combining material which becomes tacky under heat, means for heating one of said metal rolls to heat the combining material as it is fed between the non-metallic roller and the heated roller with the said combining material in contact with the heated roller, a gaseous medium for imposing pressure on the bearings of one of said rollers and said intermediate roller, a chill roll adapted to be contacted by the combining material just prior to the entry of the same between the intermediate and the heated roller, and a chill roll adapted to be contacted by the combining material as the same passes from between the intermediate and the heated roller.

14. A machine of the class described, comprising in combination two metal combining rollers, an intermediate non-metallic combining roller frictionally driven by the metal rollers, a gear train connecting the metal rollers for positively driving the same at identical peripheral speeds, a roller for carrying a web of base material, a roller for carrying a web of combining material which becomes tacky under heat, means for heating one of said metal rolls to heat the combining material as it is fed between the non-metallic roller and the heated roller with the combining material in contact with the heated roller, a gaseous medium for imposing pressure on the bearings of one of said rollers and said intermediate roller, a chill roll adapted to be contacted by the combining material just prior to the entry of the same between the intermediate and the heated roller, a chill roll adapted to be contacted by the combining material as the same passes from between the intermediate and the heated roller, and a pair of rollers for subjecting the combined material to additional pressure after it has left the last mentioned chill roll.

JOSEPH ETTL.